United States Patent
Ohnaka

[11] Patent Number: 6,118,232
[45] Date of Patent: Sep. 12, 2000

[54] CIRCUIT FOR COMPENSATING DEFLECTION IN A DISPLAY UNIT WITHOUT PICTURE DISTORTION

[75] Inventor: Osamu Ohnaka, Tokyo, Japan

[73] Assignee: NEC Corporation, Japan

[21] Appl. No.: 09/089,100

[22] Filed: Jun. 2, 1998

[30] Foreign Application Priority Data

Jun. 2, 1997 [JP] Japan .................................. 9-143956

[51] Int. Cl.[7] .............................. G09G 1/04; H01J 29/56; H01J 29/70
[52] U.S. Cl. ........................ 315/371; 315/399; 315/370; 315/369
[58] Field of Search .................. 315/371, 370, 315/399, 387, 367

[56] References Cited

U.S. PATENT DOCUMENTS

| | | | |
|---|---|---|---|
| 4,970,442 | 11/1990 | Harada | 315/367 |
| 5,021,719 | 6/1991 | Arai et al. | 315/364 |
| 5,283,505 | 2/1994 | Bando | 315/411 |
| 5,656,894 | 8/1997 | Murakami et al. | 315/371 |
| 5,831,398 | 11/1998 | Kim | 315/371 |
| 5,949,400 | 9/1999 | Kim | 345/147 |

FOREIGN PATENT DOCUMENTS

| | | | |
|---|---|---|---|
| 53-109152 | 9/1978 | Japan | G05F 1/56 |
| 54-75525 | 6/1979 | Japan | H02M 3/10 |
| 59-76171 | 5/1984 | Japan | H02M 3/155 |
| 62-85575 | 4/1987 | Japan | H04N 3/23 |
| 62-171280 | 7/1987 | Japan | H04N 3/23 |
| 63-310276 | 12/1988 | Japan | H04N 3/18 |
| 1-157264 | 6/1989 | Japan | H02M 3/00 |
| 2-299371 | 12/1990 | Japan | H04N 3/23 |
| 5-183769 | 7/1993 | Japan | H04N 3/16 |
| 5-236735 | 9/1993 | Japan | H02M 3/155 |
| 5-236736 | 9/1993 | Japan | H02M 3/155 |
| 5-336394 | 12/1993 | Japan | H04N 3/23 |
| 6-38513 | 2/1994 | Japan | H02M 3/155 |
| 6-303061 | 10/1994 | Japan | H03G 3/20 |

*Primary Examiner*—Seungsook Ham
*Assistant Examiner*—John Patti
*Attorney, Agent, or Firm*—Hayes, Soloway, Hennessey, Grossman & Hage, P.C.

[57] ABSTRACT

A compensating circuit is for compensating distortion of a picture which is displayed on a display unit having a yoke. The compensating circuit controls a yoke current to compensate a picture distortion. The compensating circuit comprises a first generating section for generating a digital deflecting compensation signal in accordance with deflecting compensation data representative of compensation value of the picture. A second generating section generating a variable voltage (+B voltage) in accordance with a PWM pulse signal to control the yoke current on the basis of the variable voltage. A peak holding circuit holds a peak voltage of a flyback pulse based on the variable voltage to produce a peak voltage signal representative of the peak voltage. An A/D converter circuit converts the peak voltage signal into a digital peak signal. A PWM section produces the above-mentioned PWN pulse signal in accordance with the digital deflecting compensation signal and the digital peak signal.

3 Claims, 6 Drawing Sheets

CIRCUIT FOR COMPENSATING DEFLECTION IN A DISPLAY UNIT WITHOUT PICTURE DISTORTION

BACKGROUND OF THE INVENTION

This invention relates to a circuit for compensating deflection in a display unit.

In general, a display unit comprises a cathode-ray tube on which displays a picture or image. In the display unit, it is difficult to be free from picture distortion. In order to compensate the picture distortion, the display unit may have a compensating circuit for compensating the picture distortion.

A conventional compensating circuit is supplied with deflecting compensation data. The conventional compensating circuit converts the deflecting compensation data into an analog compensation data. The conventional compensating circuit produces a deflecting compensation voltage signal, Furthermore, the conventional compensating circuit produces a high voltage signal in accordance with a horizontal frequency of the display unit. The high voltage signal is compensated into a compensated voltage signal on the basis of the deflecting compensation voltage signal. By the compensated voltage signal, control is made about a current of a horizontal yoke in order to compensate the picture distortion.

However, it is difficult to compensate the picture distortion with a high accuracy in the conventional compensating circuit as will be described later.

SUMMARY OF THE INVENTION

It is therefore an object of this invention to provide a compensating circuit capable of compensating a picture distortion with a high accuracy.

Other objects of this invention will become clear as the description proceeds.

On describing the gist of this invention, it is possible to understand that a compensating circuit is for compensating distortion of a picture which is displayed on a display unit having a yoke. The compensating circuit controls a yoke current to compensate a picture distortion.

According to this invention the compensating circuit comprises (A) first generating means for generating a digital deflecting compensation signal in accordance with deflecting compensation data representative of compensation value of the picture, (B) second generating means for generating a variable voltage in accordance with a PWM pulse signal to control the yoke current on the basis of the variable voltage, (C) peak holding means for holding a peak voltage of a flyback pulse based on the variable voltage to produce a peak voltage signal representative of the peak voltage, (D) A/D converter means for converting the peak voltage signal into a digital peak signal, and (E) PVM means for producing the PWN pulse signal in accordance with the digital deflecting compensation signal and the digital peak signal.

DESCRIPTION OF THE PREFERRED EMBODIMENT

Figure 1:
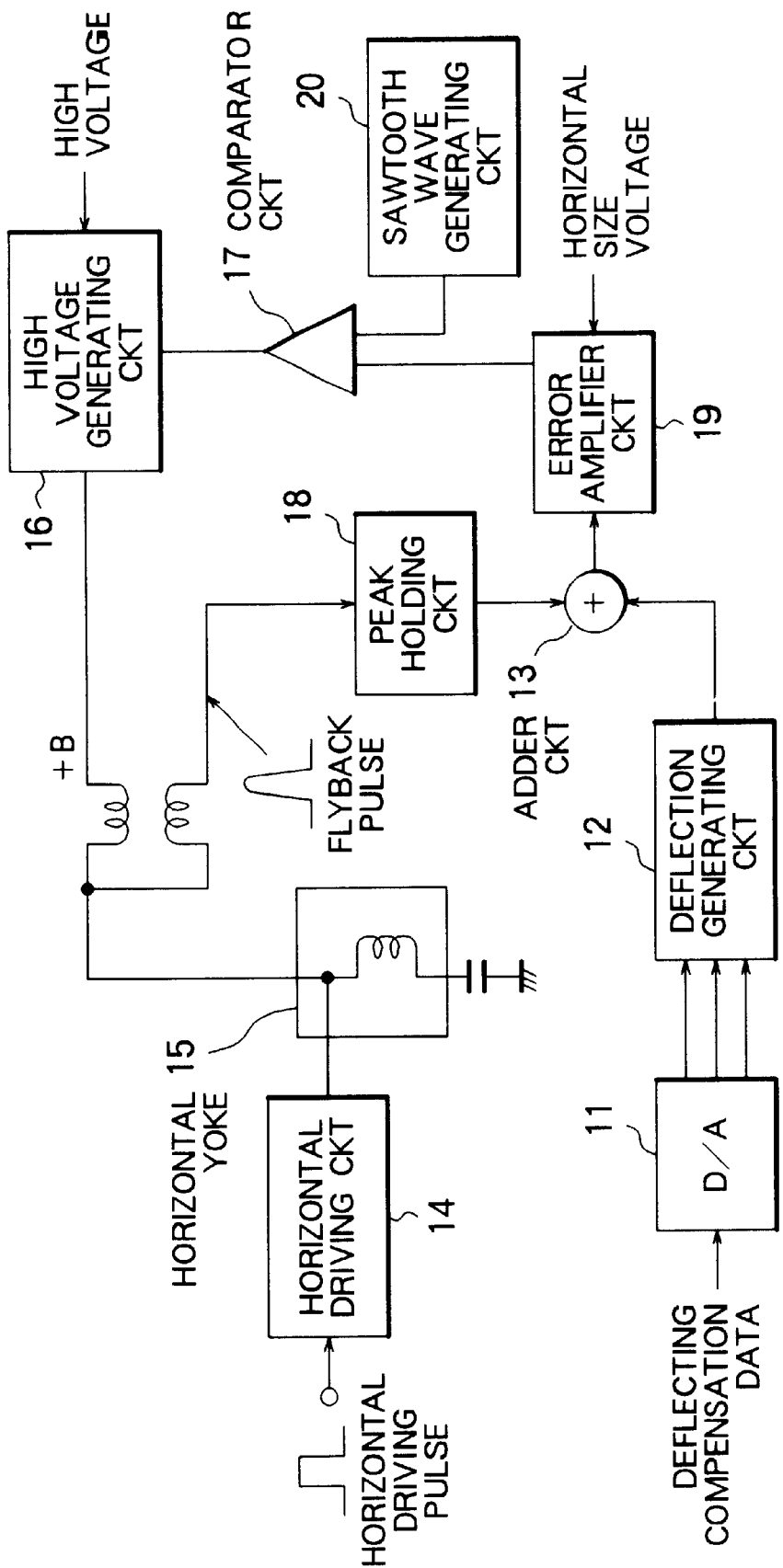
FIG. 1 is a block diagram of a conventional compensating circuit.

Referring to FIG. 1, a conventional compensating circuit will be described at first in order to facilitate an understanding of this invention. The illustrated compensating circuit is used in combination with a display unit having a cathode-ray tube on which a picture is displayed. The compensating circuit is for compensating a picture distortion. The compensating circuit comprises a digital-analog (D/A) converter 11 for converting deflecting compensation data into analog compensation data. The deflecting compensation data is supplied with the D/A converter 11 from a CPU (not shown). The analog compensation data is delivered from the D/A converter 11 to a defection generating circuit 12. In accordance with the analog compensation data, the defection generating circuit 12 generates a deflecting compensation voltage signal in synchronism with a vertical synchronizing signal. The deflecting compensation voltage signal has a form of a sawtooth wave. The deflecting compensation voltage signal may have, for example, a form of a parabolic wave. The deflecting compensation voltage signal is supplied to an adder circuit 13, The compensating circuit further comprises a horizontal driving circuit 14 to which a horizontal driving pulse signal is supplied. The horizontal driving circuit 14 drives a horizontal yoke 15 in response to the horizontal driving pulse signal. A high voltage generating circuit 16 is supplied with a high voltage signal. In response to a comparison result signal which is outputted from a comparator circuit 17, the high voltage generating circuit 16 generates a high voltage having a horizontal frequency. The high voltage fill be called +B voltage hereinunder. The +B voltage is for use in controlling a yoke current passing to the horizontal yoke 14.

A peak detecting circuit 18 is supplied with a flyback pulse based on the +B voltage. The peak detecting circuit 18 detects or holds a peak voltage of the flyback pulse to produce a peak voltage signal having the peak voltage. The peak voltage signal is supplied to the adder circuit 13. As described above, the adder circuit 13 is further supplied with the deflecting compensation voltage signal. The adder circuit 13 calculates a sum of the peak voltage signal and deflecting compensation voltage signal to produce a sum voltage signal. The sum voltage signal is supplied to an error amplifier circuit 19.

The CPU produces horizontal size data which is for use in controlling a picture size in a horizontal direction. The horizontal size data is converted into a horizontal size voltage by a D/A converter (not shown). The error amplifier circuit 19 is supplied with the horizontal size voltage. The error amplifier circuit 19 calculates an error between the sum voltage signal and the horizontal size signal to produce an error voltage signal which is supplied to the comparator circuit 17. The error voltage signal has horizontal size information and deflecting compensation information.

A sawtooth wave generating circuit 20 generates a sawtooth wave signal in synchronism with a horizontal synchronizing signal to supply the sawtooth wave signal to the comparator circuit 17. The comparator circuit 17 compares the sawtooth wave signal with the error voltage signal to produce a PWM pulse signal as the comparison result signal.

More particularly, the comparator circuit 17 slices off the sawtooth wave signal in accordance with the error voltage signal to produce the PWM pulse signal which is for use in driving the high voltage generating circuit 16.

As described above, the error voltage signal has the horizontal size information and the deflecting compensation information. Therefore, the PWM pulse signal has a variable duty ratio which varies on the basis of the horizontal size information and the deflecting compensation information. Inasmuch as the +B voltage depends upon the variable duty ratio, the +B voltage depends upon the horizontal size information and the deflecting compensation information.

As readily understood from the above description, the illustrated compensating circuit is composed of analog circuits. More particularly, each of the deflection generating circuit and the error amplifier circuit 19 is composed of an analog circuit. The compensating circuit has a plurality of electric elements such as transistors and resistors. Each of the electric elements inevitably has an element dispersion on manufacturing. On the basis of the element dispersion, offset occurs among deflecting compensation values. More Specifically, the deflecting compensation values are different from one another on the basis of the element dispersion. As a result, it is difficult to compensate the picture distortion with a high accuracy in case where each of the deflection generating circuit and the error amplifier circuit 19 is composed of the analog circuit.

Furthermore, a signal-noise (S/N) ratio becomes bad in the deflecting compensation voltage signal when noise or ripple is applied to the analog compensation data which is outputted from the D/A converter circuit 11. Similarly, each of the deflecting compensation voltage signal and the error voltage signal may be affected from noise so that S/N ratio may become bad in the compensating circuit.

At any rate, it is difficult to compensate the picture distortion with a high accuracy in the compensating circuit illustrated in FIG. 1.

Figure 2:
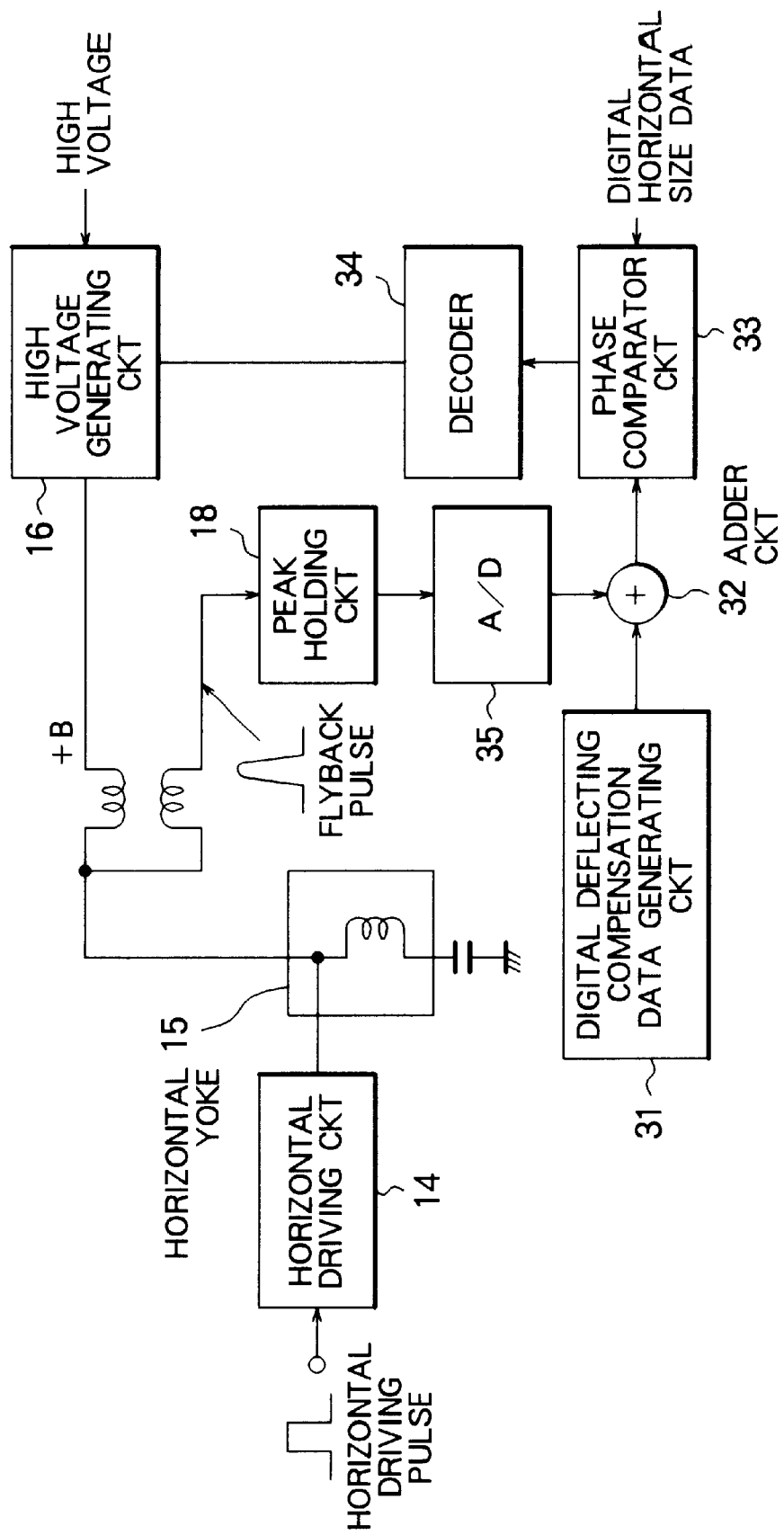
FIG. 2 is a block diagram of a compensating circuit according to an embodiment of this invention.

Referring to FIG. 2, description will proceed to a compensating circuit according to a preferred embodiment of this invention. The illustrated compensating circuit is different in structure from the compensating circuit illustrated in FIG. 1 and is therefore designated afresh by a reference numeral 30. The compensating circuit 30 comprises similar parts which are designated by like reference numerals and operable with likewise named signals. The compensating circuit 30 further comprises digital deflecting compensation data generating circuit 31, a digital adder circuit 32, a phase comparator circuit 33, decoder circuit 34, and an analog-digital (A/D) converter circuit 35.

The digital deflecting compensation data generating circuit 31 generates a digital deflecting compensation signal representative of a deflecting compensation value. The digital deflecting compensation signal is supplied to the digital adder circuit 32. As described in conjunction with FIG. 1, the peak holding circuit 18 produces the peak voltage signal in accordance with the flyback pulse. The peak holding circuit 18 supplies the peak voltage signal to the A/D circuit 35 which converts the peak voltage signal into a digital peak signal. The digital peak signal is supplied to the digital adder circuit 32.

The digital adder circuit 32 calculates a sum of the digital deflecting compensation signal and the digital peak signal to produce a digital sum signal which is supplied to the phase comparator circuit 33. The phase comparator circuit 33 is further supplied with a digital horizontal size signal representative of the picture size in the horizontal direction. The phase comparator circuit 33 compares the digital sum signal with the digital horizontal size signal to produce a phase difference signal which is representative of a phase difference between the digital sum signal and the digital horizontal size signal. The decoder circuit 34 produces the PWM pulse signal in response to the phase difference signal to supply the PWM pulse signal to the high voltage generating circuit 16. As described in conjunction with FIG. 1, the high voltage generating circuit 16 generates the +B voltage in accordance with +B voltage.

Figure 3:
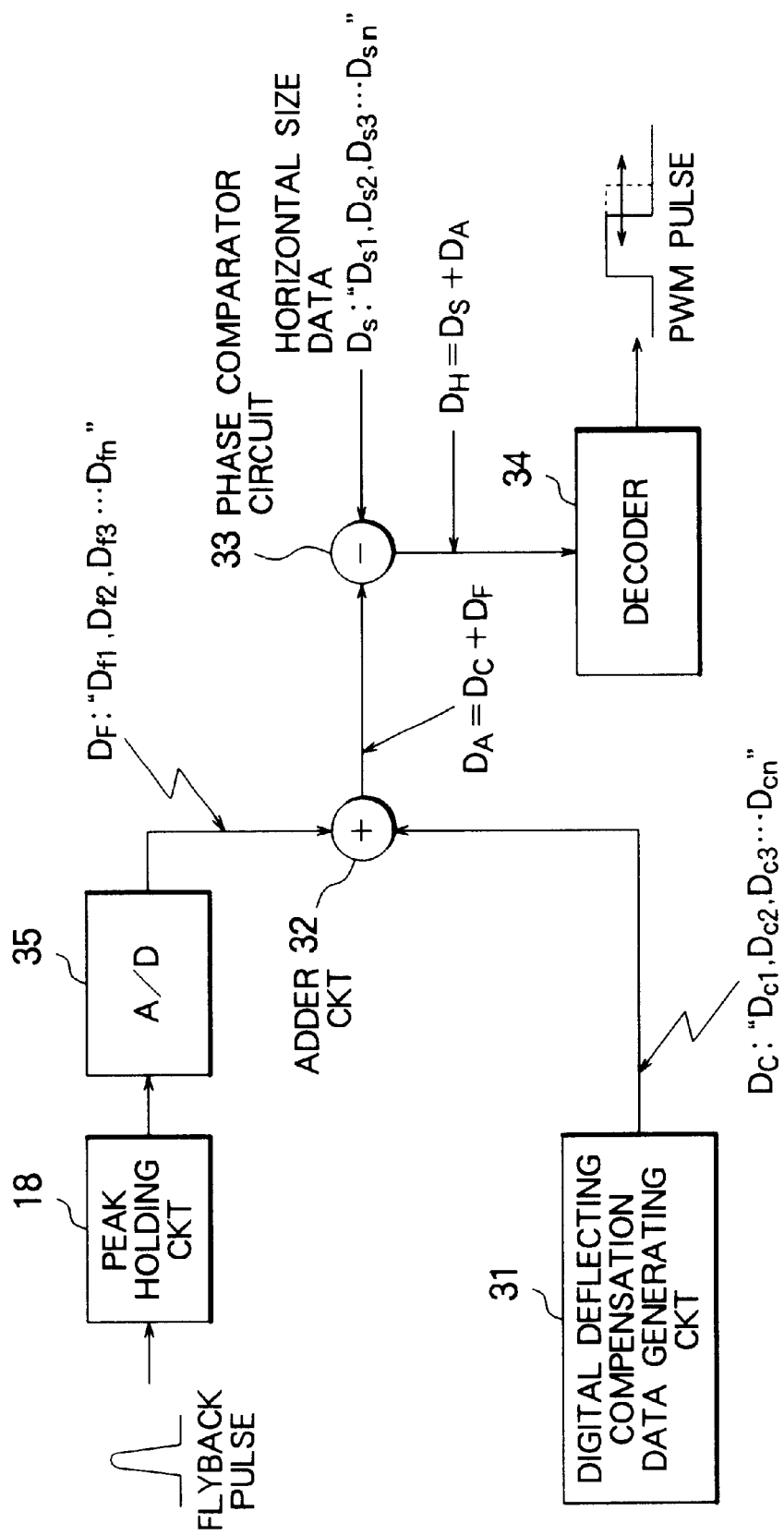
FIG. 3 is block diagram for describing operation of the compensating circuit illustrated in FIG. 2.

Referring to FIG. 3 in addition to FIG. 2, it will be assumed that the digital deflecting compensation signal is represented by Dc=Dc1, Dc2, Dc3, ..., Dcn, where n is a positive integer which is not less than eight. In other words, the digital deflecting compensation signal is composed of at least 8 bits. Furthermore, it will be assumed that the digital peak signal is represented by DF=Df1, Df2, Df3, ..., Dfn. The A/D converter circuit 35 operates a sampling clock having a clock frequency which depends upon the horizontal synchronizing frequency. More particularly, the clock frequency is not less than four times of the horizontal synchronizing frequency. The A/D converter circuit 35 has a resolution which is not less than 8 bits. The digital adder circuit 32 produces the digital sum signal given by DA=Dc+DF.

Figure 4:
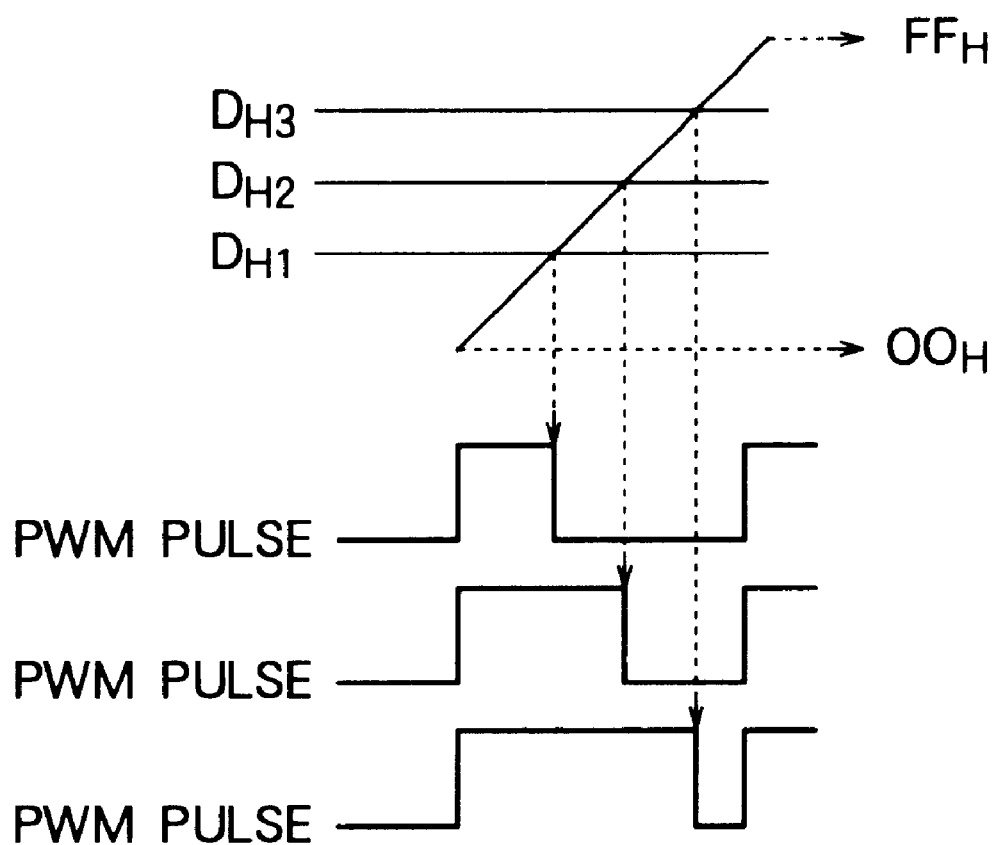
FIG. 4 shows a view for describing a PWM pulse produced in the compensating circuit illustrated in FIG. 2.

It will be assumed that the digital horizontal size signal is represented by Ds=Ds1, Ds2, Ds3, ..., Dsn. Therefore, the phase comparator circuit produces the phase difference signal given by DH=Ds−DA. The decoder circuit 34 controls the duty ratio of the PWM pulse signal in accordance with the phase difference signal. More particularly, the decoder circuit 34 has a PWM duty characteristic by depicted by "DUTY" in FIG. 4. It will be assumed that phase difference signal is represented by DH1 as shown in FIG. 4. The decoder circuit 34 produces the PWM pulse signal having a trailing edge at a first cross point of DH1 and DUTY. Similarly, the decoder circuit 34 produces the PWM pulse signal having a trailing edge at a second cross point of DH2 and DUTY when the phase difference signal is represented by DH2 as shown in FIG. 4. When the phase difference signal is represented by DH3 as shown in FIG. 4, the decoder circuit 34 produces the PWM pulse signal having a trailing edge at a third cross point of DH3 and DUTY.

Figure 5:
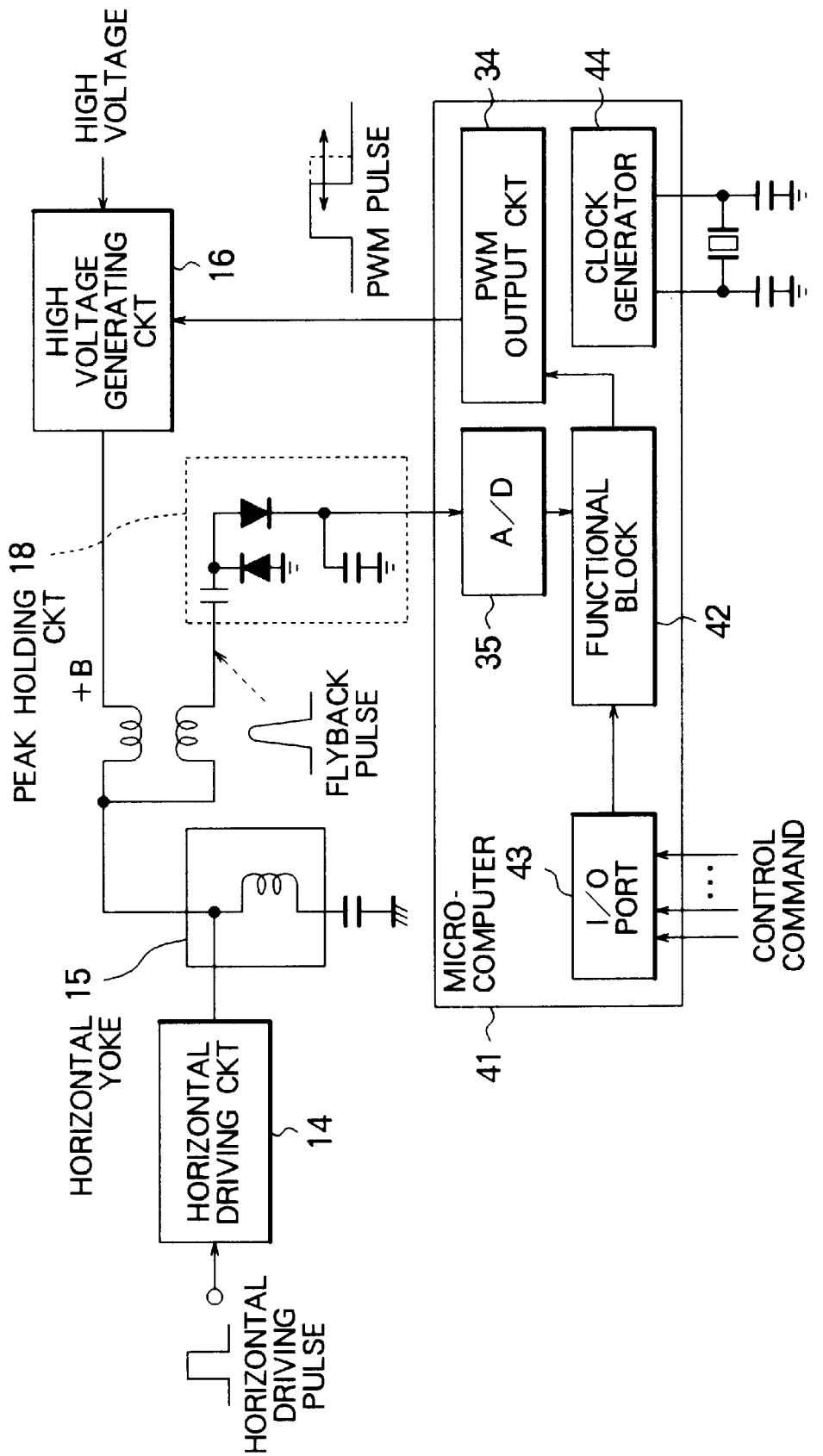
FIG. 5 is a circuit diagram of a first example of the compensating circuit illustrated in FIG. 2.

Referring to FIG. 5, description will proceed a first example of the compensating circuit 30 illustrated in FIG. 2. In FIG. 5, a micro computer 41 is connected to the peak holding circuit 18 and the high voltage generating circuit 16. The micro computer 41 comprises the A/D converter circuit 35 and the decoder circuit 34 each of which is descried in FIG. 2. In FIG. 5, the decoder circuit 34 may be called a PWM output circuit. The micro computer 41 comprises a functional block 42 which is operable as the digital-deflecting compensation data generating circuit 31, the digital adder circuit 32, and the phase comparator circuit 33, all of which are described in FIG. 2. The micro computer 41 further comprises an input-output (I/O) port 43 and a clock generator 44. The clock generator 44 generates a clock signal having a clock period which corresponds to a step travelling value of the horizontal size. In the example being illustrated, the clock signal has a clock frequency of 200 MHz.

In a cathode ray tube of 17 inches, the horizontal size is about 32 cm. When the clock frequency is equal to 200 MHz and the horizontal synchronizing frequency is equal to 100 kHz, the step travelling value is given by:

$$320 \text{ mm}/2\times(1/200 \text{ MHz})/(1/100 \text{ kHz})=0.08 \text{ mm}.$$

As described in conjunction with FIG. 2, the peak holding circuit 18 produces the peak voltage signal in accordance with the flyback pulse. The peak voltage signal is supplied to the micro computer 41. In the micro computer 41, the A/D converter circuit 35 converts the peak voltage signal into the digital peak signal to supply the digital peak signal to the functional block 42.

From a keyboard, the micro computer 41 is supplied with a control command representative of the deflecting compensation value and the horizontal size signal. The micro computer 41 receives the control command at the I/O port 43. The I/O port 43 delivers the control command to the functional block 42. In accordance with the control command, the functional block 42 calculates a digital deflecting compensation value given by:

$$aX^4 + bX^2 + cX + d \quad (1)$$

where a: side-pin corner compensation value, b: side-pin compensation value, c: trapezoidal compensation value, and d: horizontal size compensation value.

The functional block 42 produces the digital deflecting compensation value as the digital deflecting compensation signal. The functional block 42 calculates the sum of the digital deflecting compensation signal and the digital peak signal to produce the digital sum signal. The functional block 42 compares the digital sum signal with the digital horizontal size signal to produce the phase difference signal. The PWM output circuit 34 produces the PWM pulse signal in accordance with the phase difference signal to supply the PWM pulse signal to the high voltage generating circuit 16.

Figure 6:
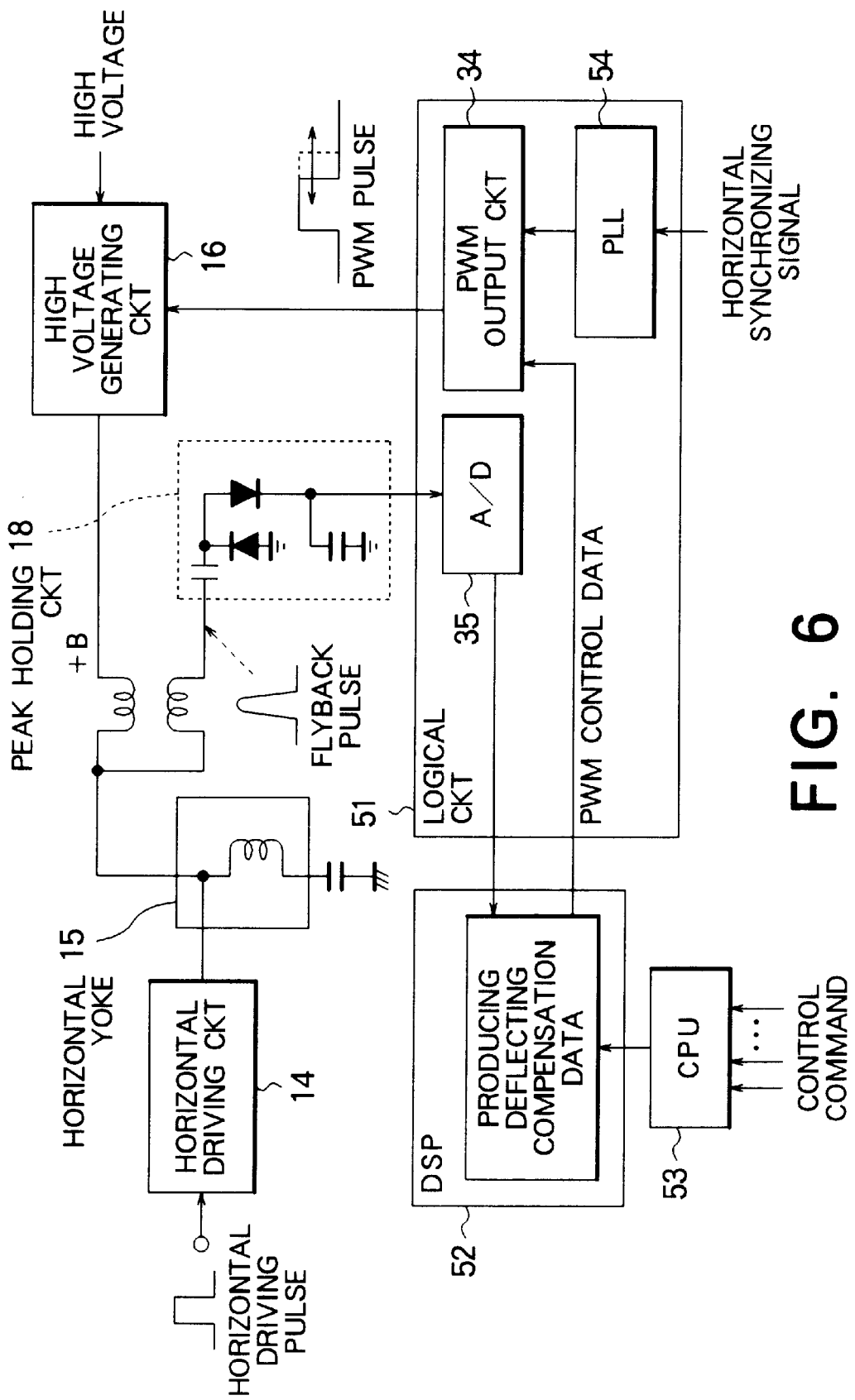
FIG. 6 is a circuit diagram of a second example of the compensating circuit illustrated in FIG. 2.

Referring to FIG. 6, description will proceed a second example of the compensating circuit 30 illustrated in FIG. 2. In FIG. 6, a logic circuit 51 is connected to the peak holding circuit 18 and the high voltage generating circuit 16. The logic circuit 51 is further connected to a digital signal processor (DSP) 52 which is connected to a CPU 53.

The logic circuit 51 comprises the A/D converter circuit 35 and the decoder circuit 34 each of which is descried in FIG. 2. In FIG. 6, the decoder circuit 34 may be called a PWM output circuit. The logic circuit 51 further comprises a PLL circuit 54 which will be described later. The digital signal processor 52 is operable as the digital deflecting compensation data generating circuit 31, the digital adder circuit 32, and the phase comparator circuit 33, all of which are described in FIG. 2.

From the keyboard, the CPU 53 is supplied with the control command representative of the deflecting compensation value and the horizontal size signal. In accordance with the control command, the CPU 53 produces the above-mentioned Equation (1) which is supplied to the digital signal processor 52. In the logic circuit 52, the A/D converter circuit 35 converts the peak voltage signal into the digital peak signal. The logic circuit 51 supplies the digital peak signal to the digital signal processor 52. Inasmuch as the digital signal processor 52 is operable as the digital deflecting compensation data generating circuit 31, the digital adder circuit 32, and the phase comparator circuit 33, the digital signal processor 52 produces the phase difference signal in a similar manner described in conjunction with FIG. 2. The phase difference signal is supplied as a PW control signal to the logic circuit 51.

The PLL circuit 54 is supplied with the horizontal synchronizing signal to produce a PLL pulse signal having a pulse period in synchronism with the horizontal synchronizing signal. The pulse period depends upon the step travelling value of the horizontal size. In the example being illustrated, the pulse signal has a pulse frequency of 200 MHz. In response to the PLL pulse signal the PSM output circuit 34 produces the PWM pulse signal in accordance with the PWN control signal to supply the PWM pulse signal to the high voltage generating circuit 16.

While this invention has thus far been described in conjunction with the preferred embodiment thereof, it will readily be possible for those skilled in the art to put this invention into practice in various other manners.

What is claimed is:

1. A circuit for compensating distortion of a picture which is displayed on a display unit having a yoke, said compensating circuit controlling a yoke current to compensate a picture distortion, wherein said compensating circuit comprises:

first signal generator for generating a digital deflecting compensation signal in accordance with deflecting compensation data representative of compensation value of said picture;

second signal generator for generating a variable voltage in accordance with a PWM pulse signal to control said yoke current on the basis of said variable voltage;

peak voltage holder for holding a peak voltage of a flyback pulse based on said variable voltage to produce a peak voltage signal representative of said peak voltage;

A/D converter for converting said peak voltage signal into a digital peak signal;

adder for calculating a sum of said digital deflecting compensation signal and said digital peak signal to produce a digital sum signal;

phase comparator for comparing said digital sum signal with digital size signal representative of size of said picture to produce a phase difference signal representative of a phase difference between said digital sum signal and said digital size signal; and PWM pulse signal outputter for outputting said PWM pulse signal in response to said phase difference signal.

2. A compensating circuit as claimed in claim 1, wherein:

a logic circuit is composed of said A/D converter and said PWM pulse signal outputter; and a digital signal processor is composed of said first signal generator, said adder, and said phase comparator.

3. A compensating circuit as claimed in claim 1, wherein a microcomputer is composed of said first and said second signal generators, said A/D converter, and said PWM pulse signal outputter.

* * * * *